(12) United States Patent
Choi (10) Patent No.: US 10,081,328 B2
(45) Date of Patent: Sep. 25, 2018

(54) CURTAIN AIRBAG FOR A VEHICLE

(71) Applicants: HYUNDAI MOTOR COMPANY, Seoul (KR); KIA MOTORS CORPORATION, Seoul (KR)

(72) Inventor: Jun Yeol Choi, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/483,715

(22) Filed: Apr. 10, 2017

(65) Prior Publication Data

US 2018/0126944 A1    May 10, 2018

(30) Foreign Application Priority Data

Nov. 4, 2016    (KR) .................. 10-2016-0146609

(51) Int. Cl.
| B60R 21/16 | (2006.01) |
|---|---|
| B60R 21/232 | (2011.01) |
| B60R 21/231 | (2011.01) |
| B60R 21/214 | (2011.01) |
| B60R 21/216 | (2011.01) |

(52) U.S. Cl.
CPC .......... B60R 21/232 (2013.01); B60R 21/214 (2013.01); B60R 21/216 (2013.01); B60R 21/23138 (2013.01); *B60R 2021/23153* (2013.01)

(58) Field of Classification Search
CPC . B60R 21/233; B60R 21/213; B60R 21/2338; B60R 21/23138; B60R 21/232; B60R 2021/23386; B60R 2021/23324; B60R 2021/23161

USPC ................ 280/730.2, 743.1, 743.2
See application file for complete search history.

(56) References Cited

U.S. PATENT DOCUMENTS

| 6,851,706 B2 * | 2/2005 | Roberts ............. B60R 21/23138 |
| | | 280/730.1 |
| 7,549,672 B2 * | 6/2009 | Sato ...................... B60R 21/207 |
| | | 280/729 |
| 8,282,124 B2 * | 10/2012 | Trovato ................ B60R 21/232 |
| | | 280/730.2 |

(Continued)

FOREIGN PATENT DOCUMENTS

| JP | 2012020719 | 2/2012 |
| JP | 2012086829 | 5/2012 |

(Continued)

OTHER PUBLICATIONS

KR Office Action dated Nov. 17, 2017, Office Action in corresponding Korean Patent Application 10-2016-0146609, dated Nov. 17, 2017, 9 pages.

*Primary Examiner* — Toan C To
(74) *Attorney, Agent, or Firm* — Lempia Summerfield Katz LLC (57) ABSTRACT

A curtain airbag for a vehicle is configured to prevent a driver's neck from being broken by preventing a driver's head from being excessively rotated upon a crash of the vehicle in a state in which the driver's head contacts an airbag tube. The curtain airbag is also configured to prevent the driver's head from slipping through or between the curtain airbag and a driver airbag by removing a gap between the curtain airbag and the driver airbag when the driver's head moves forward during a crash of the vehicle.

14 Claims, 6 Drawing Sheets

(56) References Cited

U.S. PATENT DOCUMENTS

| | | | |
|---|---|---|---|
| 8,894,094 B2 * | 11/2014 | Wang | B60R 21/232 |
| | | | 280/730.2 |
| 8,967,660 B2 * | 3/2015 | Taguchi | B60R 21/233 |
| | | | 280/729 |
| 8,998,250 B2 | 4/2015 | Kruse et al. | |
| 9,067,563 B2 | 6/2015 | Okuhara et al. | |
| 9,114,777 B2 * | 8/2015 | Fukawatase | B60R 21/232 |
| 9,266,494 B2 * | 2/2016 | Wang | B60R 21/237 |
| 9,487,180 B2 * | 11/2016 | Nakashima | B60R 21/233 |
| 9,744,936 B2 * | 8/2017 | Kruse | B60R 21/232 |
| 9,809,189 B2 * | 11/2017 | Grell | B60R 21/232 |
| 2010/0025971 A1 * | 2/2010 | Steinbach | B60R 21/232 |
| | | | 280/729 |
| 2013/0270805 A1 | 10/2013 | Kruse et al. | |
| 2014/0042732 A1 * | 2/2014 | Taguchi | B60R 21/233 |
| | | | 280/729 |
| 2014/0203541 A1 * | 7/2014 | Wei | B60R 21/213 |
| | | | 280/730.2 |
| 2016/0107603 A1 | 4/2016 | Lee | |

FOREIGN PATENT DOCUMENTS

| | | |
|---|---|---|
| JP | 2015085928 A | 5/2015 |
| KR | 20060034319 A | 4/2006 |
| KR | 20130097226 | 9/2013 |
| KR | 20160039391 A | 4/2016 |
| KR | 20160045489 A | 4/2016 |

* cited by examiner

CURTAIN AIRBAG FOR A VEHICLE

CROSS REFERENCE TO RELATED APPLICATION

The present application claims priority to and the benefit of Korean Patent Application No. 10-2016-0146609, filed on Nov. 4, 2016, the entire contents of which are incorporated herein by this reference.

BACKGROUND OF THE DISCLOSURE

1. Technical Field

The present disclosure relates to a curtain airbag for a vehicle, the curtain airbag capable of absorbing a side impact transferred to passengers.

2. Description of the Related Art

A vehicle is equipped with various kinds of airbags to protect passengers in a crash or when vehicles collide. Among the airbags, a curtain airbag for protecting passengers from a side impact, such as from another vehicle, is installed lengthwise in a front and rear direction along a side of a roof panel of a vehicle, and thus serves to hold passengers to prevent them from being catapulted out of the vehicle as well as to absorb an impact transferred to passengers upon the occurrence of a crash.

However, the existing curtain airbag is merely configured to absorb an impact transferred to a driver upon the occurrence of a crash and therefore has a problem in that a driver's head contacts the curtain airbag and then is rotated, whereby a driver's neck may be broken. Further, as a gap is formed between the curtain airbag and a driver airbag, a driver's head may slip through or between the curtain airbag and the driver airbag, such that the existing curtain airbag may not sufficiently absorb the impact transferred to the driver.

The matters described as the related art have been provided only for assisting in understanding the background of the present disclosure and should not be considered as corresponding to the related art known to those skilled in the art.

SUMMARY OF THE DISCLOSURE

An object of the present disclosure is to provide a curtain airbag for a vehicle. The disclosed curtain airbag is capable of preventing a passenger's head from being excessively rotated upon a crash or when vehicles collide in a state in which the passenger's head contacts the curtain airbag. The disclosed curtain airbag is also capable of preventing a driver's head from slipping through or between the curtain airbag and a driver airbag.

According to an embodiment of the present disclosure, there is provided a curtain airbag for a vehicle. The disclosed curtain airbag includes an airbag tube configured to include a main chamber that is inflated by being supplied with a gas from an inflator and that absorbs an impact when a driver's head moves laterally upon a crash and includes an auxiliary chamber that is bendably connected to the main chamber and supplied with the gas from the main chamber to be inflated later than the main chamber. The disclosed curtain airbag includes a guide panel configured to be fixedly installed on a vehicle body and connected to the airbag tube to support the main chamber and the auxiliary chamber so that the main chamber and the auxiliary chamber are inflated inwardly when the airbag tube is inflated. When the driver's head moves laterally upon a crash to collide with the main chamber, as the gas within the main chamber moves to the auxiliary chamber, the auxiliary chamber may be inflated and bent inwardly by the guide panel to prevent the gas within the auxiliary chamber from reflowing to the main chamber.

The airbag tube may further include a rear chamber to be bendably connected to a back end of the main chamber and the auxiliary chamber may be bendably connected to a front end of the main chamber.

The inflator may be installed on the rear chamber and thus, when the airbag tube is inflated, the auxiliary chamber may be supplied with the gas from the main chamber to be inflated last after the main chamber and the rear chamber are unfolded.

The airbag tube may be provided with a first chamber wall non-inflated at a boundary line in which the rear chamber and the main chamber are connected and a second chamber wall non-inflated at a boundary line in which the main chamber and the auxiliary chamber are connected.

The airbag tube may be provided with a first communication hole through which the gas flows from the boundary line between the rear chamber and the main chamber to both ends of the first chamber wall and may be provided with a second communication hole through which the gas flows from the boundary line between the auxiliary chamber and the main chamber to both ends of the second chamber wall.

A diameter of the first communication hole may be formed to be larger than a diameter of the second communication hole.

The first chamber wall may extend vertically and a central portion thereof may extend to be bent backward.

A longitudinal width of the second chamber wall may be formed to be wider than a width of the first chamber wall.

The guide panel may be disposed at an outside with respect to the airbag tube and a back end of the guide panel may be connected to a boundary line in which the rear chamber and the main chamber are connected and a front end of the guide panel may be fixed to a vehicle body.

The back end of the guide panel may be formed to correspond to a shape of the first chamber wall to be connected to the first chamber wall.

The airbag tube may be provided with a first depression part in which an upper end of the boundary line in which the rear chamber and the main chamber are connected is depressed downward.

The airbag tube may be provided with a second depression part in which a lower end of the boundary line in which the auxiliary chamber and the main chamber are connected is depressed upward.

A back end of the guide panel may be connected to the boundary line in which the main chamber and the auxiliary chamber are connected and a front end of the guide panel may be fixed to a vehicle body.

The guide panel may be provided with a first tether configured to have a back end connected to the boundary line in which the main chamber and the auxiliary chamber are connected and to have a front end connected to the front of the auxiliary chamber and be disposed at the outside of the main chamber. The guide panel maybe be provided with a second tether configured to have a back end connected to a front of the auxiliary chamber along with the first tether and to have a front end fixed to the vehicle body.

The guide panel may be provided with a first panel part configured to have a back end connected to the boundary line in which the main chamber and the auxiliary chamber are connected and to have a front end connected to the central portion of the auxiliary chamber and the guide panel and disposed at an inside of the main chamber. The guide panel may be provided with a second panel part configured to have a back end connected to the front of the auxiliary chamber along with the first panel part and to have a front end fixed to the vehicle body.

When the airbag tube is unfolded, the rear chamber may be positioned to correspond to a header of a passenger on a rear seat, the main chamber may be positioned to correspond to a driver's head, and the auxiliary chamber may be positioned in front of a driver airbag provided at a driver's seat.

DETAILED DESCRIPTION

Hereinafter, a curtain airbag for a vehicle according to an embodiment of the present disclosure will be described with reference to the accompanying drawings.

Figure 1:
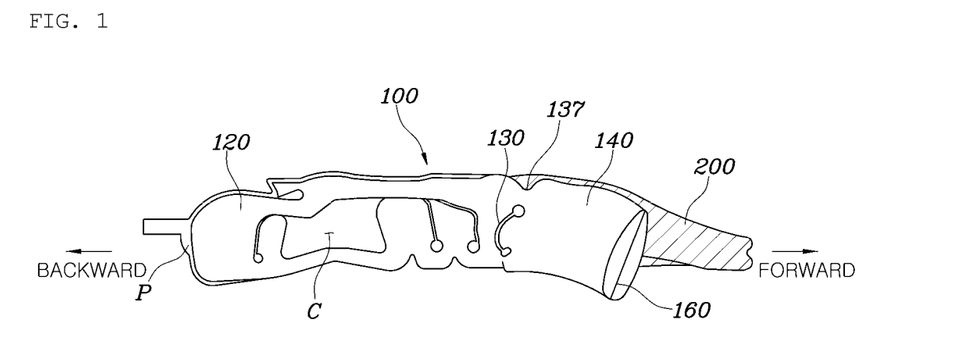
FIG. 1 is a diagram illustrating a curtain airbag for a vehicle according to an embodiment of the present disclosure.
Figure 2:
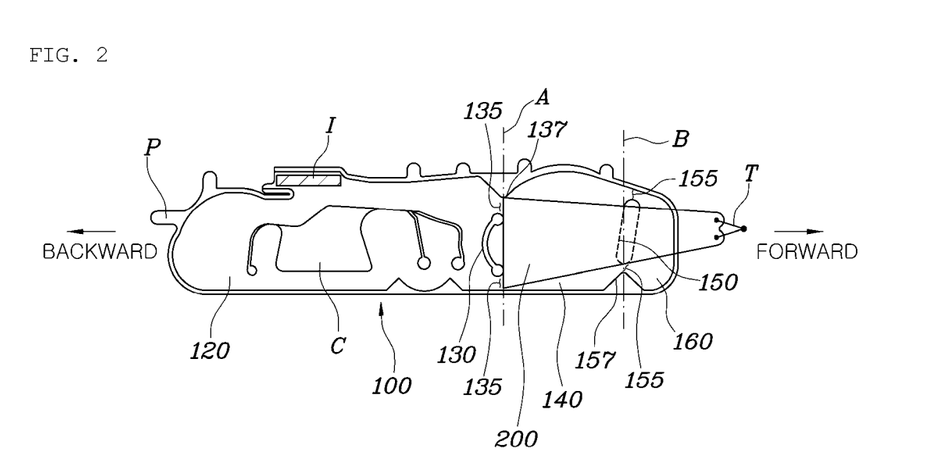
FIGS. 2 and 3 are diagrams for describing the curtain airbag for a vehicle and as illustrated in FIG. 1.
Figure 3:
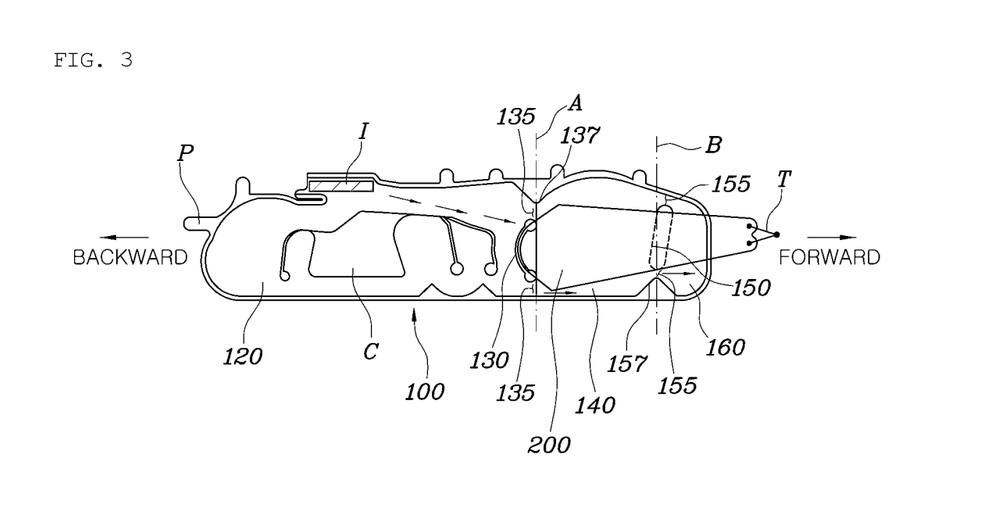
Figure 4:
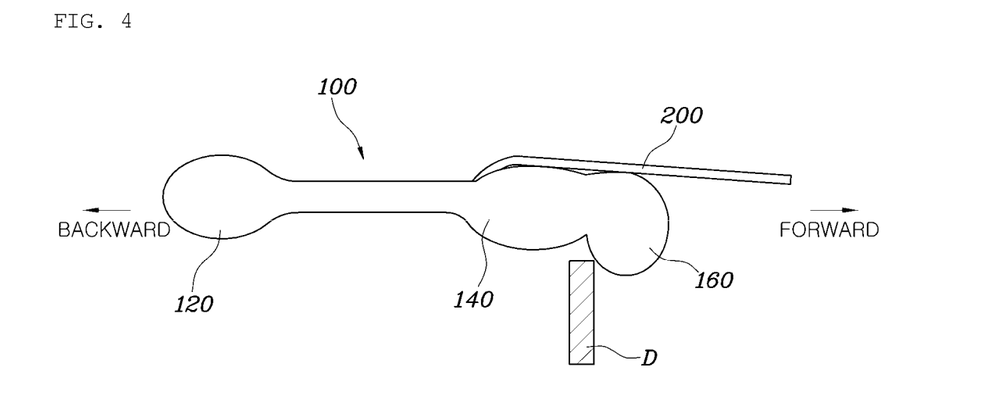
FIG. 4 is a diagram illustrating a first embodiment of a guide panel according to the curtain airbag for a vehicle and as illustrated in FIG. 1.
Figure 5:
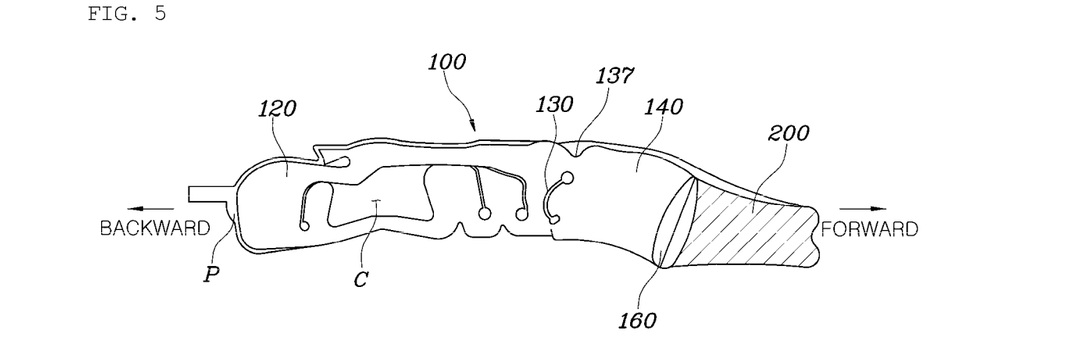
FIGS. 5-7 are diagrams illustrating a second embodiment of a guide panel according to the curtain airbag for a vehicle and as illustrated in FIG. 1.
Figure 6:
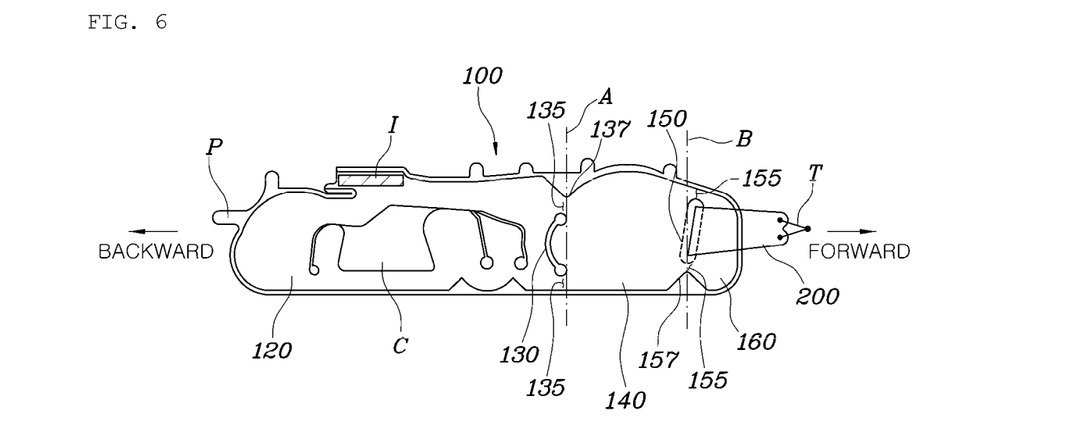
Figure 7:
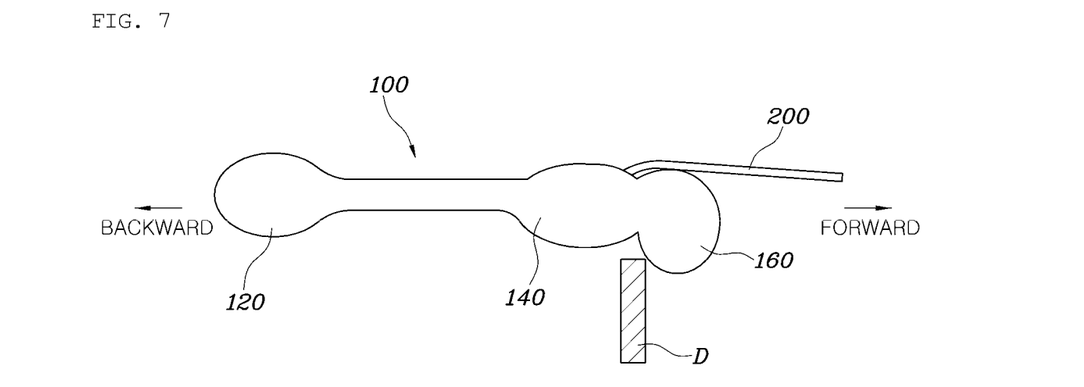
Figure 8:
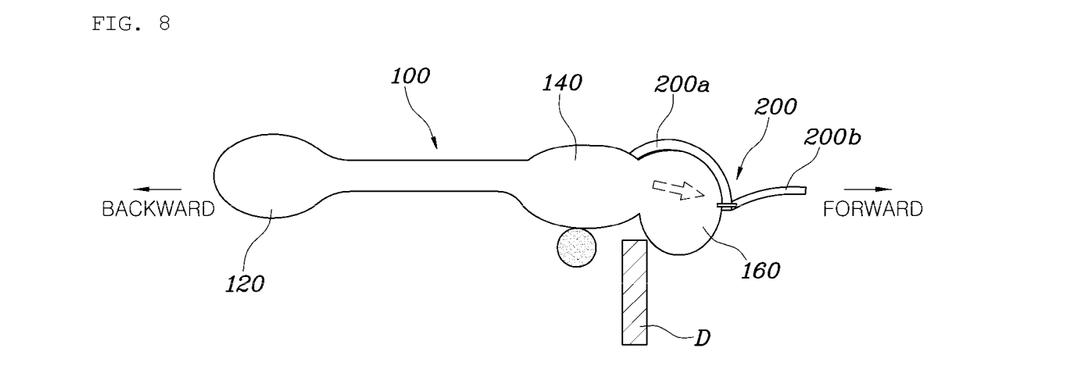
FIGS. 8 and 9 are diagrams illustrating a third embodiment of a guide panel according to the curtain airbag for a vehicle and as illustrated in FIG. 1.
Figure 9:
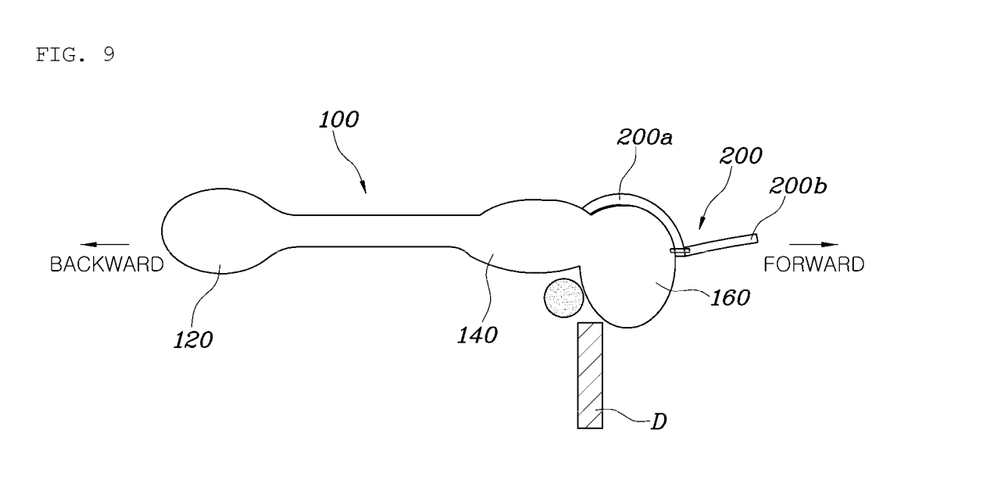
Figure 10:
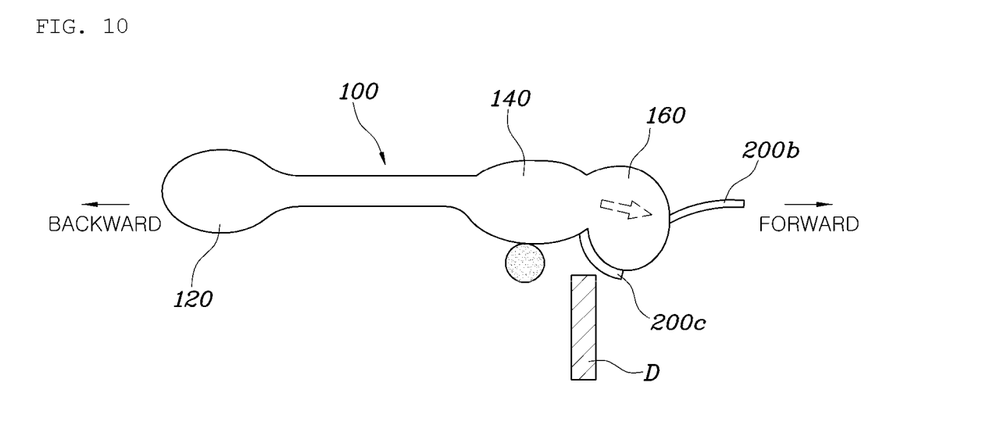
FIGS. 10 and 11 are diagrams illustrating a fourth embodiment of a guide panel according to the curtain airbag for a vehicle and as illustrated in FIG. 1.
Figure 11:
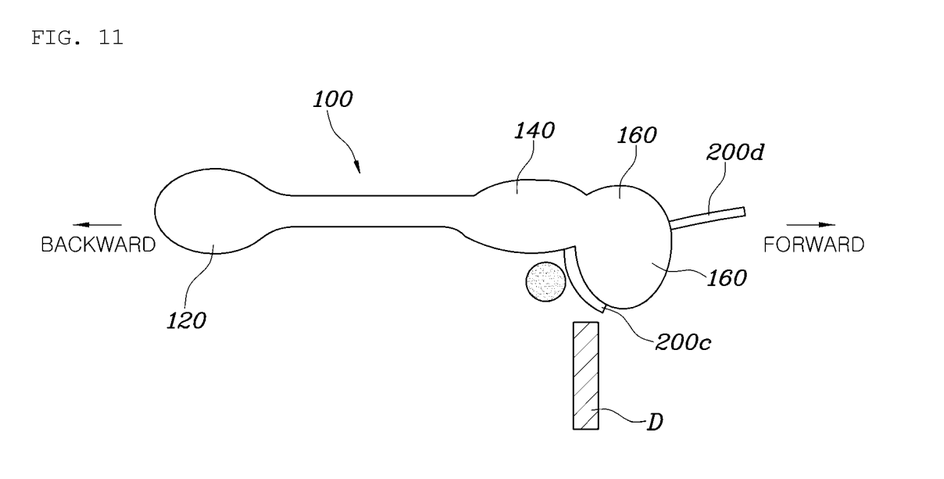

FIG. 1 is a diagram illustrating a curtain airbag for a vehicle according to an embodiment of the present disclosure. FIGS. 2 and 3 are diagrams for describing the curtain airbag for a vehicle and as illustrated in FIG. 1. FIG. 4 is a diagram illustrating a first embodiment of a guide panel according to the curtain airbag for a vehicle and as illustrated in FIG. 1. FIGS. 5-7 are diagrams illustrating a second embodiment of a guide panel according to the curtain airbag for a vehicle and as illustrated in FIG. 1. FIGS. 8 and 9 are diagrams illustrating a third embodiment of a guide panel according to the curtain airbag for a vehicle and as illustrated in FIG. 1, and FIGS. 10 and 11 are diagrams illustrating a fourth embodiment of a guide panel according to the curtain airbag of a vehicle illustrated in FIG. 1.

As illustrated in FIG. 1, the curtain airbag for a vehicle according to an embodiment of the present disclosure may include an airbag tube 100 configured to include a main chamber 140 that is inflated by being supplied with a gas from an inflator I and configured to absorb an impact when a driver's head moves laterally. The airbag tube 100 also includes an auxiliary chamber 160 that is bendably connected to the main chamber 140 and supplied with the gas from the main chamber 140 to be inflated later than the main chamber 140. The curtain airbag also includes a guide panel 200 configured to be fixedly installed on a vehicle body and connected to the airbag tube 100 to support the main chamber 140 and the auxiliary chamber 160 so that the main chamber 140 and the auxiliary chamber 160 are inflated inwardly when the airbag tube 100 is inflated. By this configuration, when the driver's head moves laterally upon a crash of the vehicle and collides with the main chamber 140, as the gas within the main chamber 140 moves to the auxiliary chamber 160, the auxiliary chamber 160 is inflated and is bent inwardly by the guide panel 200, thereby preventing the gas within the auxiliary chamber 160 from reflowing to the main chamber 140.

As such, the curtain airbag according to an embodiment of the present disclosure is configured to include the airbag tube 100 that includes the main chamber 140 and the auxiliary chamber 160 and the guide panel 200. In this configuration, the airbag tube 100 is installed on a ceiling or a roof in a vehicle and is unfolded downward upon the occurrence of a crash so as to be located between a door glass and a passenger. In particular, in the case of the airbag tube 100, when the driver's head contacts the main chamber 140 upon a side impact or lateral crash of the vehicle, such as when another vehicle collides with the side of the vehicle, the main chamber 140 is pressed by absorbing an impact. Thus, the gas within the main chamber 140 moves to the auxiliary chamber 160, and the auxiliary chamber 160 is supplied with the gas from the main chamber 140 to be inflated. Thus, the auxiliary chamber 160 is inflated later than the main chamber 140.

At the same time, the airbag tube 100 is supported by the guide panel 200 disposed at an outside thereof and thus is inflated inwardly, such that the main chamber 140 is inflated and then is unfolded to be bent inwardly upon the expansion of the auxiliary chamber 160. In other words, the guide panel 200 is connected to the airbag tube 100 and is fixedly installed on a vehicle body and is disposed on the outside of the airbag tube 100. Thus, when the airbag tube 100 is inflated, the main chamber 140 and the auxiliary chamber 160 are supported to the guide panel 200 to be inflated inwardly. As such, the guide panel 200 supports the airbag tube 100 so that the airbag tube 100 is not unfolded outwardly when the airbag tube 100 is unfolded and serves to support the airbag tube 100 so that the airbag tube is unfolded inwardly. The airbag tube 100 and the guide panel 200 may be made of the same material.

As described above, in the curtain airbag according to an embodiment of the present disclosure, the airbag tube 100 is unfolded upon a crash and the main chamber 140 and the auxiliary chamber 160 are inflated inwardly by the guide panel 200. In particular, when the main chamber 140 protects the driver's head from a lateral crash or side impact, and the gas within the main chamber 140 moves to the auxiliary chamber 160, the auxiliary chamber 160 is inflated later than the main chamber 140. At that time, the auxiliary chamber 160 is bendably connected to the main chamber 140, and is therefore unfolded to be bent inwardly to enclose the driver's head, thereby preventing the driver's head from colliding with a vehicle trim when the driver's head moves in a front and rear direction.

Describing in detail an embodiment of the present disclosure, as illustrated in FIGS. 1 and 2, the airbag tube 200 may further include a rear chamber 120 bendably connected to a back end of the main chamber 140. The auxiliary chamber 160 may be bendably connected to a front end of the main chamber 140. As such, the airbag tube 100 is integrally connected to the rear chamber 120, the main chamber 140, and the auxiliary chamber 160. The rear chamber 120, the main chamber 140, and the auxiliary chamber 160 are all configured to communicate with the gas and thus are entirely inflated when being unfolded. Therefore, when the airbag tube 100 is inflated, the rear chamber 120 is positioned to correspond to a head of a passenger on a rear seat and the main chamber 140 is positioned to correspond to a head of a driver on a driver's seat and may be formed so that the auxiliary chamber 160 is positioned in front of the driver's seat. In this example, the auxiliary chamber 160 is preferably positioned in front of a driver airbag D when being inflated.

In other words, as the airbag tube 100 is formed lengthwise in a front and rear direction in a vehicle body, the airbag tube 100 may be configured to simultaneously protect the passenger on the rear seat and the driver on the driver's seat. The airbag tube 100 may have an unfolded form such that the rear chamber 120 is positioned to correspond to the head of the passenger on the rear seat and the main chamber 140 is positioned to correspond to the head of the driver on the driver's seat to thereby protect the head of the rear seat passenger and the head of the driver from an impact. In addition, the auxiliary chamber 160 is bendably connected to the main chamber 140 and is positioned in front of the driver airbag D to prevent the driver's head from slipping between or through a gap in the curtain airbag and the driver airbag D, thereby preventing the driver's head from colliding with the vehicle trim.

Further, the inflator I is installed on the rear chamber 120. Thus, when the airbag tube 200 is inflated, the auxiliary chamber 160 is supplied with the gas from the main chamber 140 to be inflated last after the main chamber 140 and the rear chamber 160 are unfolded.

As such, the rear chamber 120 of the airbag tube 100 is provided with the inflator I, and a gas from the inflator I is simultaneously supplied to the rear chamber 120 and the main chamber 140 to simultaneously inflate the rear chamber 120 and the main chamber 140. Here, the main chamber 140 supports the driver's head to transfer the gas within the main chamber 140 to the auxiliary chamber 160 when absorbing an impact from the side or laterally, such that the auxiliary chamber 160 is inflated later than the main chamber 140. In other words, the main chamber 140 is inflated earlier than the auxiliary chamber 160 to absorb the impact due to the lateral movement of the driver's head and then the auxiliary chamber 160 is inflated by being supplied with the gas from the main chamber 140 to position the driver's head between the driver airbag D and the airbag tube 100 while restricting the driver's head from being excessively rotated due to the movement of the driver's head in the front and rear direction.

As illustrated in FIG. 2, the airbag tube 100 may be provided with a non-inflation area C into which gas is not introduced. The airbag tube 100 may be fixed to a separate airbag panel P by a backstitch to be kept in a taut state when being unfolded. The non-inflation area C formed at the airbag tube 100 may be positioned in a space between the driver's seat and the rear seat and the airbag panel P may be integrally foamed with the airbag tube 100.

In particular, according to an embodiment of the present disclosure, as illustrated in FIG. 2, the airbag tube 100 may be provided with a first chamber wall 130 that is non-inflated at a boundary line A in which the rear chamber 120 and the main chamber 140 are connected. The airbag tube 100 may also be provided with a second chamber wall 150 that is non-inflated at a boundary line B to which the main chamber 140 and the auxiliary chamber 160 are connected. By doing so, the rear chamber 120 and the main chamber 140 may be bent at the boundary line A formed on the first chamber wall 130. The main chamber 140 and the auxiliary chamber 160 may also be bent at the boundary line B where the second chamber wall 150 is formed. The first chamber wall 130 and the second chamber wall 150 may be positioned not to correspond to the driver's head and may be designed in consideration of a bending angle.

The airbag tube 100 according to an embodiment of the present disclosure is configured to make gas flow among the rear chamber 120, the main chamber 140, and the auxiliary chamber 160. The airbag tube 100 may be provided with a first communication hole 135 through which the gas flows from the boundary line A between the rear chamber 120 and the main chamber 140 to both ends of the first chamber wall 130 and may be provided with a second communication hole 155 through which the gas flows from the boundary line B between the main chamber 140 and the auxiliary chamber 160 to both ends of the second chamber wall 150.

In other words, the first chamber wall 130 is installed at a vertically central portion of the boundary line A between the rear chamber 120 and the main chamber 140. Both ends of the first chamber wall 130 may be provided with the first communication hole 135 by being spaced apart from an upper end and a lower end of the airbag tube 100. The rear chamber 120 and the main chamber 140 may be configured to make gas flow therebetween by the first communication hole 135. In addition, the main chamber 140 may be connected to be bendable at the rear chamber 120 and thus is inflated while being bent inwardly by the guide panel 200 when the main chamber 140 is inflated. The first communication hole 135 may be closed by the bending to prevent the gas introduced into the main chamber 140 from being discharged to the rear chamber 120.

Further, the second chamber wall 150 is installed at a vertically central portion of the boundary line B between the main chamber 140 and the auxiliary chamber 160. Both ends of the second chamber wall 150 may be provided with the second communication hole 155 by being spaced apart from the upper end and the lower end of the airbag tube 100. The main chamber 140 and the auxiliary chamber 160 may be configured to make gas flow therebetween by the second communication hole 155. In addition, the auxiliary chamber 160 is connected to be bendable at the main chamber 140 and thus is supported by the guide panel 200 when being inflated to be inflated while being bent inwardly. As such, the second communication hole 155 is closed by the bending upon the inflation of the auxiliary chamber 160 to prevent the gas introduced into the auxiliary chamber 160 from being discharged to the main chamber 140.

As such, in the airbag tube 100, including the rear chamber 120, the main chamber 140, and the auxiliary chamber 160, the flow of gas may be controlled by the first communication hole 135 and the second communication hole 155 that are foamed by the first chamber wall 130 and the second chamber wall 150.

In more detail, a diameter of the first communication hole 135 may be formed to be larger than that of the second communication hole 155. In other words, as the diameter of the first communication hole 135 is formed to be larger than the diameter of the second communication hole 155, the main chamber 140 is sufficiently supplied with gas to be quickly inflated. The diameter of the second communication hole 155 is formed to be relatively smaller to reduce a transfer rate of the gas introduced into the main chamber 140 to the auxiliary chamber 160. As such, the main chamber 140 is quickly inflated and an inflation rate of the auxiliary chamber 160 is delayed. Thus, the main chamber 140 is quickly inflated upon the inflation of the airbag tube 100 to absorb the impact transferred to the driver's head. Then the main chamber 140 is pressed by the driver's head to inflate the auxiliary chamber 160 when the gas is forcibly transferred to the auxiliary chamber 160 to unfold the auxiliary chamber 160 toward the driver.

As such, the size of the first communication hole 135 is different from that of the second communication hole 155. Thus, the main chamber 140 and the auxiliary chamber 160 are sequentially unfolded to sufficiently absorb the impact transferred to the driver's head and then control the position of the driver's head, thereby efficiently protecting the driver.

Meanwhile, as illustrated in FIG. 2, the first chamber wall 130 may be extended vertically and a central portion thereof may be extended to be bent backward. As such, the first chamber wall 130 may have a [ shape because the central portion thereof is extended to be bent backward. As the airbag tube 100 is supported by the guide panel 200 at the outside when being unfolded, the main chamber 140 is unfolded while being bent inwardly with respect to the rear chamber 120. At this point, the first chamber wall 130 is subjected to a pulling force when the main chamber 140 is unfolded and thus is changed or straightened from a bent shape to a straighter or straight stretched shape. As such, as the bent shape of the first chamber wall 130 is spread when the airbag tube 100 is unfolded, the main chamber 140 may be sufficiently bent.

In addition, the airbag tube 100 may be provided with a first depression part 137. An upper end of the boundary line A is depressed downward in the first depression part 137. The rear chamber 120 and the main chamber 140 are connected in the upper end of the boundary line A. As such, the first depression part 137 is famed at the upper end of the boundary line A to which the main chamber 140 is connected. Thus, the main chamber 140 is unfolded while being bent at the rear chamber 120 and the bending angle may be sufficiently increased by the first depression part 137. Therefore, the main chamber 140 may be unfolded by being smoothly bent at the rear chamber 120.

Meanwhile, a longitudinal width of the second chamber wall 150 is formed to be wider than a width of the first chamber wall 130. Thus, the bending angle of the auxiliary chamber 160 at the main chamber 140 may be greatly increased. As a result, when the airbag tube 100 is unfolded, the increased bending angle of the auxiliary chamber 160 is secured as the width of the second chamber wall 150 is formed to be wide. Thus, the auxiliary chamber 160 may be positioned in front of the driver's seat.

In addition, the airbag tube 100 is provided with a second depression part 157. The lower end of the boundary line B is depressed upward. The main chamber 140 and the auxiliary chamber 160 are connected in the lower end of the boundary line B. Thus, the auxiliary chamber 160 is unfolded while being bent at the main chamber 140 and the bending angle of the auxiliary chamber 160 is sufficiently increased by the second depression part 157. Thus, the auxiliary chamber 160 may be unfolded while being bent at the main chamber 140 at a sufficient angle.

Meanwhile, the guide panel 200 according to the embodiment of the present disclosure is connected to the airbag tube 100. The guide panel 200 is also mounted on the vehicle body to guide the unfolding of the airbag tube 100 but may be variously applied.

The guide panel 200 according to the first embodiment may be disposed outwardly with respect to the airbag tube 100. The back end of the guide panel 200 is connected to the boundary line A in which the rear chamber 120 and the main chamber 140 may be connected. The front end of the guide panel 200 may be fixed to the vehicle body.

As illustrated in FIG. 2, the back end of the guide panel 200 is connected to the boundary line A in which the rear chamber 120 and the main chamber 140 are connected. The front end of the guide panel 200 is fixedly installed on a vehicle body frame and is formed wider on a plane to support the main chamber 140 and the auxiliary chamber 160 of the airbag tube 100. The back end of the guide panel 200 may be fixed to the airbag tube 100 by being sewed to the airbag tube 100. The front end of the guide panel 200 may be fixed by a tether T and the guide panel 200 may be installed to be inclined inwardly to meet an internal shape of the vehicle when the airbag tube 100 is unfolded. As a result, when the airbag tube 100 is unfolded, the main chamber 140 may be expanded while being bent inwardly with respect to the rear chamber 120.

Preferably, the back end of the guide panel 200 may be formed to correspond to the shape of the first chamber wall 130 and may be connected to the first chamber wall 130. In other words, as illustrated in FIG. 3, the shape of the rear end of the guide panel 200 may be formed to correspond to the shape of the first chamber wall 130 and may be connected to the first chamber wall 130. Thus, the guide panel 200 supports the main chamber 140 while pulling the main chamber 140 when the airbag tube 100 is unfolded, such that the main chamber 140 may be inflated inwardly while being smoothly bent. Further, as the back end of the guide panel 200 is foamed to correspond to the first chamber wall 130, the guide panel 200 may support the main chamber 140 to bend the main chamber 140 inwardly while the size of the guide panel 200 is made small. Further, as described above, the first chamber wall 130 is formed to be bent. The guide panel 200 pulls the first chamber wall 130 when the airbag tube 100 is unfolded to more smoothly change the shape of the first chamber wall 130, such that the main chamber 140 may be unfolded by being smoothly bent.

Meanwhile, the back end of the guide panel 200 according to a second embodiment may be connected to the boundary line B in which the main chamber 140 and the auxiliary chamber 160 are connected. The front end of the guide panel 200 may be fixed to the vehicle body. That is, as illustrated in FIGS. 5-7, the back end of the guide panel 200 is connected to the boundary line B in which the main chamber 140 and the auxiliary chamber 160 are connected. The front end of the guide panel 200 is fixedly installed to the vehicle body frame and is formed wider in a plane, such that the guide panel 200 may support only the auxiliary chamber 160. As a result, as the guide panel 200 supports the auxiliary chamber 160 at the outside when the airbag tube 100 is unfolded, the auxiliary chamber 160 may be guided to be inflated while being bent inwardly at the main chamber 140.

As such, as the auxiliary chamber 160 is supported by the guide panel 200 at the main chamber 140 to be inflated while being bent inwardly, the driver's head may contact the auxiliary chamber 160 to be stably supported.

Meanwhile, the guide panel 200 according to a third embodiment may be configured to include a first tether 200a. The first tether 200a may have a back end connected to the boundary line B in which the main chamber 140 and the auxiliary chamber 160 are connected. The first tether 200a may have a front end connected to the front of the auxiliary chamber 160 and disposed at the outside of the main chamber 140. The guide panel 200 may also be configured to include a second tether 200b having a back end connected to the front of the auxiliary chamber 160 along with the first tether 200a and having a front end fixed to the vehicle body.

In other words, as illustrated in FIG. 8, the guide panel 200 may be configured to include the first tether 200a and the second tether 200b. As the first tether 200a is disposed at the outside of the auxiliary chamber 160 and is connected to the front and back of the auxiliary chamber 160, the first tether 200a supports the auxiliary chamber 160 when the airbag tube 100 is inflated. Thus, the auxiliary chamber 160 is inflated inwardly. Here, the back end of the second tether 200b is connected to the front of the auxiliary chamber 160 and the front end of the second tether 200b is fixed to the vehicle body. Therefore, the auxiliary chamber 160 is guided to be inflated while being bent inwardly. At the same time, the inflation position of the auxiliary chamber 160 is fixed to be positioned in front of the driver airbag D.

As a result, as illustrated in FIG. 8, as the driver's head contacts the main chamber 140 upon a side impact crash of the vehicle, the gas within the main chamber 140 moves to the auxiliary chamber 160 to inflate the auxiliary chamber 160. At this point, as the first tether 200a supports the auxiliary chamber 160, the auxiliary chamber 160 is inflated while being bent inwardly. Here, as illustrated in FIG. 9, when the auxiliary chamber 160 is sufficiently inflated, the second tether 200b fixes the position of the auxiliary chamber 160. As the auxiliary chamber 160 is maintained in the bent state depending on the expansion, the gas within the auxiliary chamber 160 does not reflow to the main chamber 140.

Meanwhile, the guide panel 200 according to a fourth embodiment may be provided with a first panel part 200c configured to have a back end connected to the boundary line B in which the main chamber 140 and the auxiliary chamber 160 are connected. The first panel part 200c may also be configured to have a front end connected to the central portion of the auxiliary chamber 160 and disposed at the inside of the main chamber 140. The guide panel 200 may also be provided with a second panel part 200d configured to have a back end connected to the front of the auxiliary chamber 160 along with the first panel part 200c and to have a front end fixed to the vehicle body.

In other words, as illustrated in FIG. 10, the guide panel 200 may be configured to include the first panel part 200c and the second panel part 200d. The first panel part 200c is disposed at the inside of the auxiliary chamber 160 and is connected to the central portion of the auxiliary chamber 160. Thus, the first panel part 200c pulls the auxiliary chamber 160 when the airbag tube 100 is inflated, such that the auxiliary chamber 160 is inflated while being bent inwardly. Here, the back end of the second panel part 200d is connected to the front of the auxiliary chamber 160 and the front end of the second panel part 200d is fixed to the vehicle body. Therefore, the auxiliary chamber 160 is guided to be inflated while being bent inwardly. At the same time, the position of the auxiliary chamber 160 is fixed to be positioned in front of the driver airbag D.

As a result, as illustrated in FIG. 10, as the driver's head contacts the main chamber 140 upon a side impact crash of the vehicle, the gas within the main chamber 140 moves to the auxiliary chamber 160 to inflate the auxiliary chamber 160. At this point, as the first panel part 200c pulls the auxiliary chamber 160, the auxiliary chamber 160 is inflated while being bent inwardly. Here, as illustrated in FIG. 11, when the auxiliary chamber 160 is sufficiently inflated, the second panel part 200d fixes the position of the auxiliary chamber 160. Further, as the auxiliary chamber 160 is maintained in the bent state depending on the expansion, the gas within the auxiliary chamber 160 does not reflow to the main chamber 140.

According to the curtain airbag for a vehicle having the foregoing structure, it is possible to prevent the driver's neck from being broken by preventing the driver's head from being excessively rotated upon a crash of vehicle in the state in which the driver's head contacts the airbag tube 100.

Further, it is possible to prevent the driver's head from slipping through or between the curtain airbag and the driver airbag by removing the gap between the curtain airbag and the driver airbag D when the driver's head moves forward during a crash of the vehicle.

Although the present disclosure has been shown and described with respect to specific embodiments, it will be obvious to those skilled in the art that the present disclosure may be variously modified and altered without departing from the spirit and scope of the present disclosure as defined by the following claims.

What is claimed is:

1. A curtain airbag for a vehicle, the curtain airbag comprising:
   an airbag tube configured to include a main chamber that is inflated by being supplied with a gas from an inflator and to absorb an impact when a driver's head moves laterally and to include an auxiliary chamber that is bendably connected to the main chamber and supplied with the gas from the main chamber to be inflated later than the main chamber; and
   a guide panel configured to be fixedly installed on a vehicle body and connected to the airbag tube to support the main chamber and the auxiliary chamber so that the main chamber and the auxiliary chamber are inflated inwardly when the airbag tube is inflated,
   wherein when the driver's head moves laterally upon a crash of the vehicle to collide with the main chamber, as the gas within the main chamber moves to the auxiliary chamber, the auxiliary chamber is inflated and is bent inwardly by the guide panel to prevent the gas within the auxiliary chamber from reflowing to the main chamber,
   wherein the airbag tube further includes a rear chamber bendably connected to a back end of the main chamber,
   wherein the auxiliary chamber is bendably connected to a front end of the main chamber, and
   wherein the airbag tube is provided with a first depression part in which an upper end of a boundary line in which the rear chamber and the main chamber are connected is depressed downward.

2. The curtain airbag of claim 1, wherein the inflator is installed on the rear chamber whereby, when the airbag tube is inflated, the auxiliary chamber is supplied with the gas from the main chamber to be inflated last after the main chamber and the rear chamber are unfolded.

3. The curtain airbag of claim 1, wherein the airbag tube is provided with a first chamber wall non-inflated at a boundary line in which the rear chamber and the main chamber are connected and is provided with a second chamber wall non-inflated at a boundary line in which the main chamber and the auxiliary chamber are connected.

4. The curtain airbag of claim 3, wherein the airbag tube is provided with a first communication hole through which the gas flows from the boundary line between the rear chamber and the main chamber to both ends of the first chamber wall and is provided with a second communication hole through which the gas flows from the boundary line between the auxiliary chamber and the main chamber to both ends of the second chamber wall.

5. The curtain airbag of claim 4, wherein a diameter of the first communication hole is formed to be larger than a diameter of the second communication hole.

6. The curtain airbag of claim 3, wherein the first chamber wall is extended vertically and a central portion of the first chamber wall is extended to be bent backward.

7. The curtain airbag of claim 3, wherein a longitudinal width of the second chamber wall is formed to be wider than a width of the first chamber wall.

8. The curtain airbag of claim 3, wherein the guide panel is disposed at an outside with respect to the airbag tube, wherein a back end of the guide panel is connected to a boundary line in which the rear chamber and the main chamber are connected and a front end of the guide panel is fixed to a vehicle body.

9. The curtain airbag of claim 8, wherein the back end of the guide panel is formed to correspond to a shape of the first chamber wall to be connected to the first chamber wall.

10. The curtain airbag of claim 1, wherein a back end of the guide panel is connected to a boundary line in which the main chamber and the auxiliary chamber are connected and a front end of the guide panel is fixed to a vehicle body.

11. The curtain airbag of claim 1, wherein the guide panel is provided with a first panel part configured to have a back end connected to a boundary line in which the main chamber and the auxiliary chamber are connected and to have a front end connected to a central portion of the auxiliary chamber and the guide panel and disposed at an inside of the main chamber, and is provided with a second panel part configured to have a back end connected to a front of the auxiliary chamber along with the first panel part and to have a front end fixed to the vehicle body.

12. The curtain airbag of claim 1, wherein when the airbag tube is unfolded, the rear chamber is positioned to correspond to a head of a passenger on a rear seat, the main chamber is positioned to correspond to a driver's head, and the auxiliary chamber is positioned in front of a driver airbag provided at a driver's seat.

13. A curtain airbag for a vehicle, the curtain airbag comprising:
   an airbag tube configured to include a main chamber that is inflated by being supplied with a gas from an inflator and to absorb an impact when a driver's head moves laterally and to include an auxiliary chamber that is bendably connected to the main chamber and supplied with the gas from the main chamber to be inflated later than the main chamber; and
   a guide panel configured to be fixedly installed on a vehicle body and connected to the airbag tube to support the main chamber and the auxiliary chamber so that the main chamber and the auxiliary chamber are inflated inwardly when the airbag tube is inflated,
   wherein when the driver's head moves laterally upon a crash of the vehicle to collide with the main chamber, as the gas within the main chamber moves to the auxiliary chamber, the auxiliary chamber is inflated and is bent inwardly by the guide panel to prevent the gas within the auxiliary chamber from reflowing to the main chamber,
   wherein the airbag tube further includes a rear chamber bendably connected to a back end of the main chamber, and wherein the auxiliary chamber is bendably connected to a front end of the main chamber, and
   wherein the airbag tube is provided with a second depression part in which a lower end of a boundary line in which the auxiliary chamber and the main chamber are connected is depressed upward.

14. A curtain airbag for a vehicle, the curtain airbag comprising:
   an airbag tube configured to include a main chamber that is inflated by being supplied with a gas from an inflator and to absorb an impact when a driver's head moves laterally and to include an auxiliary chamber that is bendably connected to the main chamber and supplied with the gas from the main chamber to be inflated later than the main chamber; and
   a guide panel configured to be fixedly installed on a vehicle body and connected to the airbag tube to support the main chamber and the auxiliary chamber so that the main chamber and the auxiliary chamber are inflated inwardly when the airbag tube is inflated,
   wherein when the driver's head moves laterally upon a crash of the vehicle to collide with the main chamber, as the gas within the main chamber moves to the auxiliary chamber, the auxiliary chamber is inflated and is bent inwardly by the guide panel to prevent the gas within the auxiliary chamber from reflowing to the main chamber,
   wherein the airbag tube further includes a rear chamber bendably connected to a back end of the main chamber, and wherein the auxiliary chamber is bendably connected to a front end of the main chamber, and
   wherein the guide panel is provided with a first tether, the first tether having a back end connected to a boundary line in which the main chamber and the auxiliary chamber are connected and having a front end connected to the front of the auxiliary chamber, the first tether disposed at the outside of the main chamber, and wherein the guide panel is provided with a second tether configured to have a back end connected to a front of the auxiliary chamber along with the first tether and to have a front end fixed to the vehicle body.

* * * * *